(12) United States Patent
Yoo (10) Patent No.: US 6,643,388 B1
(45) Date of Patent: Nov. 4, 2003

(54) SHAPE DETECTION DEVICE AND MANUFACTURING METHOD THEREOF

(75) Inventor: Jong Ho Yoo, Goyang (KR)

(73) Assignee: Saerhim Techmate Corporation, Goyang (KR)

( * ) Notice: Subject to any disclaimer, the term of this patent is extended or adjusted under 35 U.S.C. 154(b) by 0 days.

(21) Appl. No.: 09/396,925

(22) Filed: Sep. 15, 1999

(30) Foreign Application Priority Data

Mar. 4, 1999 (KR) .......................................... 1999-7181

(51) Int. Cl.[7] ................................................ G06K 9/00
(52) U.S. Cl. ........................ 382/124; 345/173; 382/312
(58) Field of Search ................................ 345/173, 174; 382/124, 125, 312; 29/830, 739, 741; 178/18.06; 257/415; 324/716, 658, 662

(56) References Cited

U.S. PATENT DOCUMENTS

| | | | | |
|---|---|---|---|---|
| 4,644,801 A | * | 2/1987 | Kustanovich | .......... 73/862.046 |
| 5,079,949 A | * | 1/1992 | Tamori | .......... 73/172 |
| 5,594,222 A | | 1/1997 | Caldwell | .......... 200/600 |

* cited by examiner

Primary Examiner—Amelia M. Au
Assistant Examiner—Colin LaRose
(74) Attorney, Agent, or Firm—Howard & Howard (57) ABSTRACT

A shape detection device which can detect the existence/absence or normal/abnormal state of an object and the shape and movement of the object by directly contacting the object. The shape detection device includes a shape detection section having two substrates on which a plurality of electrodes are formed and which are arranged to face each other or in the same direction with a predetermined space therebetween and bonded together by an insulating adhesive filled into the space between the substrates. The shape detection device is manufactured by forming the plurality of electrodes on the substrates, arranging the substrates to face each other or in the same direction with the predetermined space therebetween, bonding the substrates together by filling the insulating adhesive into the space between the substrates, and grinding edge portions of the electrodes formed on the substrates bonded together. The shape detection device can lengthen its life span and can be manufactured at a low cost with superior productivity.

6 Claims, 8 Drawing Sheets

SHAPE DETECTION DEVICE AND MANUFACTURING METHOD THEREOF

BACKGROUND OF THE INVENTION

1. Field of the Invention

The present invention relates generally to a shape recognition device which can detect the existence/absence or normal/abnormal state of an object, and the shape and movement of the object. In particular, the present invention relates to the construction of a shape detection device for detecting the shape and movement of a conductive object by directly contacting the object.

2. Description of the Related Art

A device has been proposed for recognizing the shape of human fingerprints as one of the conventional devices for recognizing and discriminating the shape of an object. This fingerprint recognition device discriminates and identifies the owner of a specified fingerprint, and accordingly it can selectively permit his or her access to a specified device.

The conventional fingerprint recognition device solves the problem involved in mechanical locks which may be easily released by a person who understands the structure of the mechanical locks well and has undesirable intentions, and permits only specified persons access to the specified target by recognizing the fingerprints having inherently different shapes from one another.

The conventional fingerprint recognition device may employ either type of an optical detection section using an image pickup device, that is, an indirect contact type shape detection section for being in indirect contact with the human body or the object and detecting the amount of electric charge differently charged thereon in accordance with the minute differences in the distance between the peaks and valleys in the fingerprint or the object, or a direct contact type shape detection section for being in direct contact with the human body or the object and detecting minute electric signal flowing therethrough.

Figures 1, 2A:
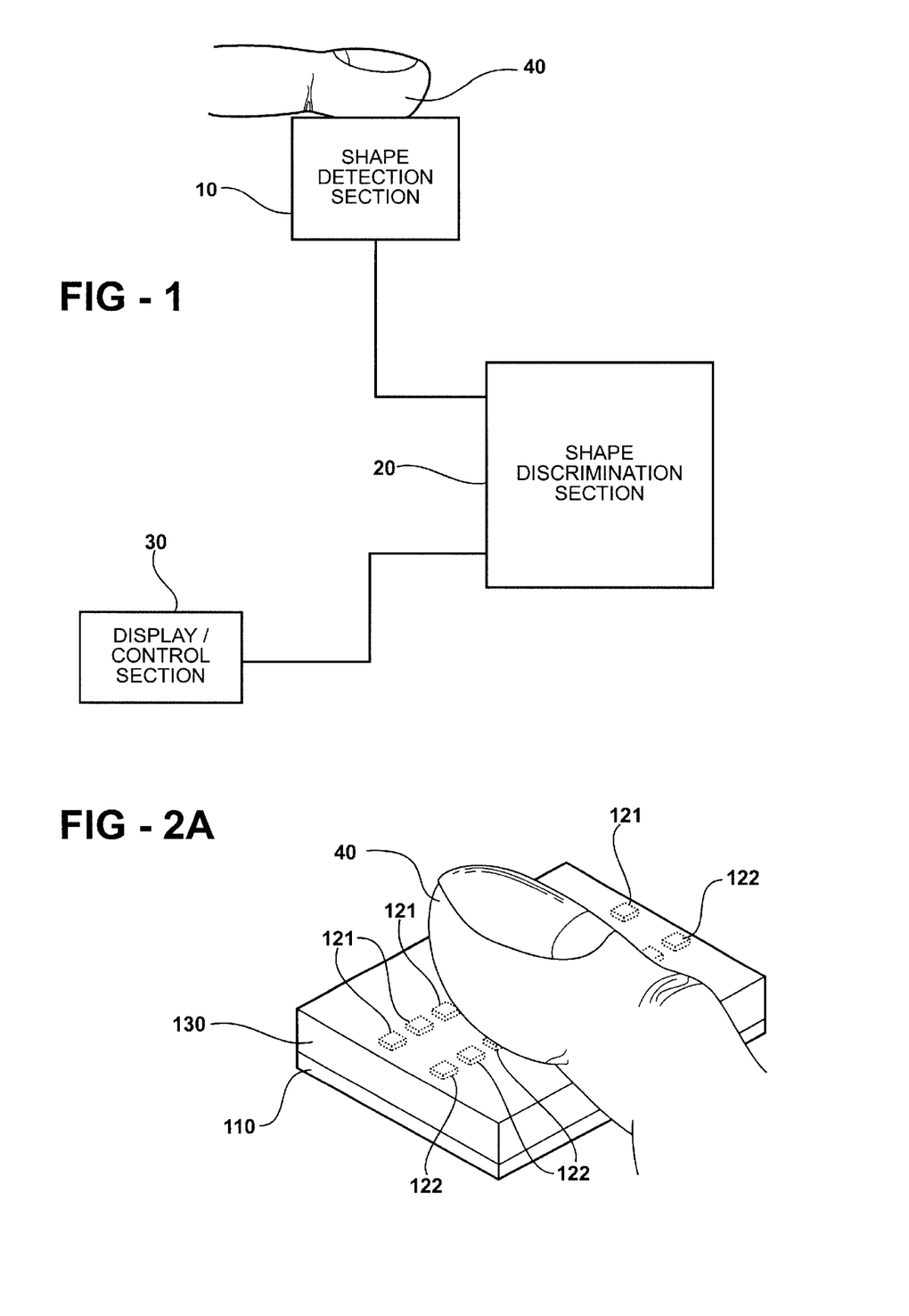
FIG. 1 is a block diagram of a conventional shape recognition device for recognizing the shape of an object.
FIGS. 2A and 2B are views illustrating the structure and the use of an indirect contact type shape detection section of the conventional shape recognition device.
Figure 2B:
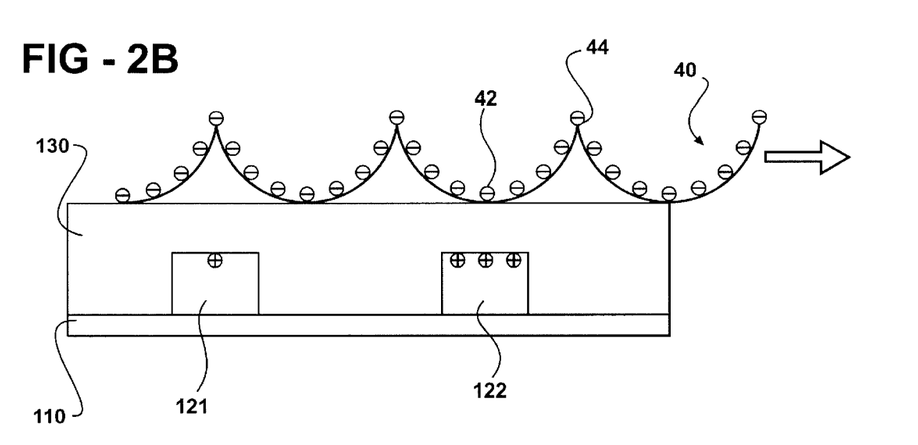
Figure 3A:
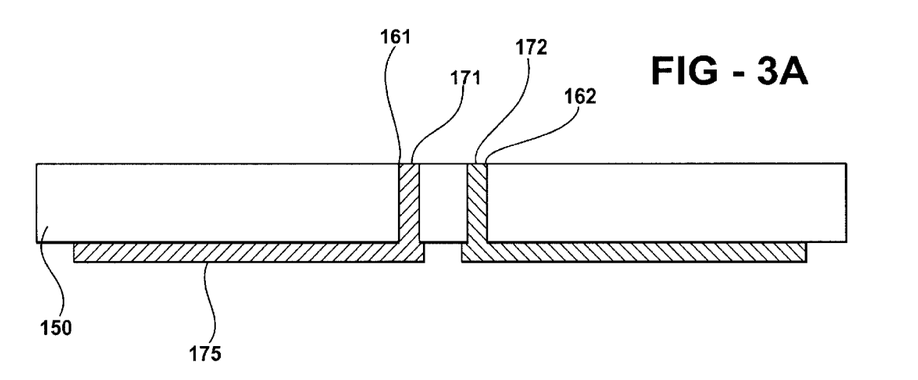
FIGS. 3A and 3B are views illustrating the structure and the use of a direct contact type shape detection section of the conventional shape recognition device.
Figure 3B:
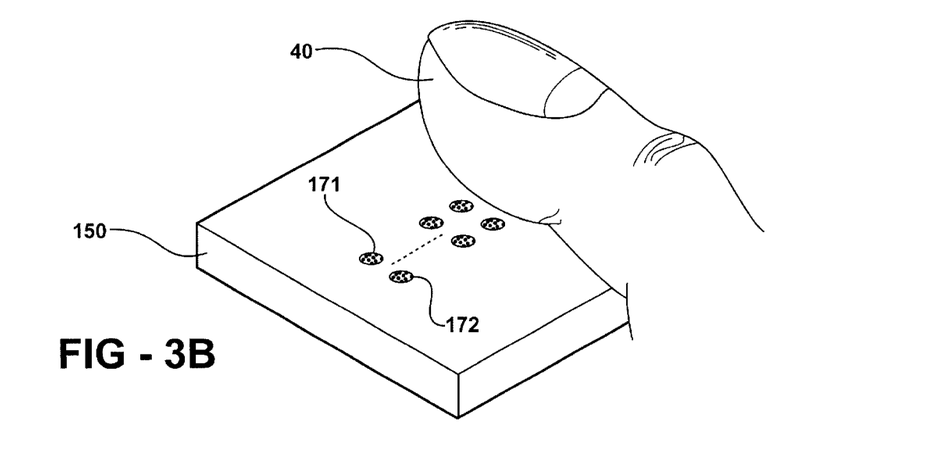

FIG. 1 is a block diagram of a conventional shape recognition device for recognizing the shape of an object. FIGS. 2A and 2B are views illustrating the structure and the use of an indirect contact type shape detection section of a conventional shape recognition device. FIGS. 3A and 3B are views illustrating the structure and the use of a direct contact type shape detection section of a conventional shape recognition device.

The construction and operation of the conventional device for recognizing the shape of the fingerprint or the object will be explained in detail with reference to the accompanying drawings.

Referring to FIG. 1, the conventional shape recognition device includes a shape detection section 10 for detecting the minute electric signal flowing through a fingerprint 40 or an object or for detecting the amount of charge charged thereon, a shape discrimination section 20 for discriminating the shape of the fingerprint or the object by comparing electric signals outputted from the shape detecting section 10 corresponding to the shape of the fingerprint or the object and outputting a corresponding control signal, and a display/control section 30 for performing the necessary shape display or control function in accordance with the control signal outputted from the shape discrimination section 20.

The conventional optical shape detection section 10 using an image pickup device, not being illustrated in the drawings, has drawbacks in that it is expensive and it is difficult to ascertain the authenticity of the object if a photograph is used for the shape detection instead of the actual object, thereby limiting its use.

According to the conventional indirect contact type shape detection section 10 as shown in FIGS. 2A and 2B, the charges residing on peaks 42 and valleys 44, which are protrusions and recesses of the fingerprint 40 or the object, respectively, are detected by a plurality of first electrodes 121 and second electrodes 122 respectively arranged at regular intervals which are determined to be smaller than those between the peaks 42 and valleys 44. The first and second electrodes 121 and 122 are respectively formed in a line on the upper portion of an insulating substrate 110 by a semiconductor manufacturing process, and electrically connected to the shape discrimination section 20 through signal transmission lines (not illustrated).

The upper surface of the first and second electrodes 121 and 122 are coated with an anti-wear dielectric 130.

As described above, the first and second electrodes 121 and 122 of the indirect type shape detection section 10 detect the electric charges residing on the fingerprint 40 or the object. At this time, the amounts of charge detected by the respective electrodes 121 and 122 differ from one another due to the minute differences in distance between the peaks 42 and the valleys 44 of the fingerprint 40 or the object.

The electrodes may be arranged in multiple lines, and the shape detection signals detected by the respective electrodes in accordance with the different amounts of charge residing on the fingerprint 40 or the object are applied to the shape discrimination section 20 through the signal transmission lines.

The shape discrimination section 20 processes and converts the received signals into data corresponding to the shape of the fingerprint 40 or the object, discriminates the shape of the fingerprint 40 or the object by comparing the data with reference data stored therein, and then outputs a corresponding control signal to the display/control section 30, so that the display/control section 30 controls the operation of a security device.

Also, in the event that the fingerprint 40 or the object detected by the shape detection section 10 moves in a certain direction, the shape discrimination section 20 discriminates the moving direction of the object by processing the signals sensed by the electrodes, which reflect the variation of the sensed charge amounts, and provides the corresponding control signal to the display/control section 30. Accordingly, it can perform the function of a mouse or a joystick used in a multimedia appliance.

However, the conventional indirect contact type shape detection device has drawbacks in that the anti-wear dielectric 130 for contacting the fingerprint 40 or the object is finally worn away by the repeated use thereof, and this causes an error to occur in detecting the amount of charge in accordance with the minute differences in distance between the electrodes and the fingerprint 40 or the object, so that the shape or the position of the object cannot be accurately identified accurately.

There are limitations in increasing the anti-wear characteristic of the dielectric 130, and the indirect contact type shape detection section is expensive since it is manufactured using a semiconductor thin film manufacturing process, thereby limiting its use.

The conventional direct contact type shape detection section 10 as shown in FIGS. 3A and 3B has been proposed to solve the problems of the indirect contact type shape detection section.

According to the conventional direct contact type shape detection section 10 of FIGS. 3A and 3B, a plurality of first row holes 161 and second row holes 162, the diameter of which does not exceed 0.1 mm at maximum, are formed on an insulating substrate 150 by a laser boring or drilling, or by other specified methods. At this time, the space between the holes is determined not to exceed a maximum of 0.1 mm.

Thereafter, the first row electrodes 171 and second row electrodes 172 are formed by filling the first row holes 161 and the second row holes 162 with conductive metal by plating, application, insertion, etc. The lower portions of the first and second row electrodes 171 and 172 are respectively connected to signal transmission lines 175 formed on the lower surface of the insulating substrate by plating, application, printing, etc. The signal transmission lines 175 transmit the signals detected by the first and second row electrodes 171 and 172 to the shape discrimination section 20.

The minute electric signals flowing through the human body or the object are detected by the first and second row electrodes 171 and 172 formed on the substrate 150 which are respectively in direct contact with the peaks 42 of the fingerprint 40 or the object. The sensed electric signals are applied to the shape detection section 10, and the shape detection section 10 transmits the sensed electric signals to the shape discrimination section 20. The following operation will be the same as the conventional indirect contact type shape detection section as described above.

However, the conventional direct contact type shape detection device has drawbacks in that the perforation of the plurality of first and second row holes 161 and 162 on the substrate 150 as well as the filling of the holes 161 and 162 with the conductive metal by plating, application, insertion, etc. requires a high degree of technical accuracy which causes the production rate of inferior goods to increase, so that productivity decreases and the manufacturing cost increases, thereby limiting its popular use.

SUMMARY OF THE INVENTION

It is the object of the present invention to solve the problems involved in the related art, and to provide a direct contact type shape detection device which can lengthen its life span without being affected by the wear of the dielectric which can be manufactured inexpensively with superior productivity.

In one aspect of the present invention, there is provided a shape detection device comprising:
- a shape detection section including two substrates each having a plurality of electrodes formed on one surface thereof, the substrates being arranged to face each other with a predetermined space therebetween and being bonded together by an insulating adhesive filled in the space between the substrates;
- a shape discrimination section for discriminating a shape or the moving direction of an object in accordance with sensed signals outputted from the shape detection section, and outputting a corresponding control signal; and
- a display/control section for performing a display or control function in accordance with the control signal outputted from the shape discrimination section.

In another aspect of the present invention, there is provided a method of manufacturing a shape detection device comprising the steps of:
- forming a plurality of electrodes on insulating substrates;
- arranging the substrates to face each other with a predetermined space therebetween;
- bonding the substrates together by filling an insulating adhesive into the space between the substrates; and
- grinding edge portions of the electrodes formed on the substrates bonded together.

BRIEF DESCRIPTION OF THE DRAWINGS

The above object, other features and advantages of the present invention will become more apparent by describing the preferred embodiments thereof with reference to the accompanying drawings, in which.

DETAILED DESCRIPTION OF THE PREFERRED EMBODIMENTS

Figure 4A:
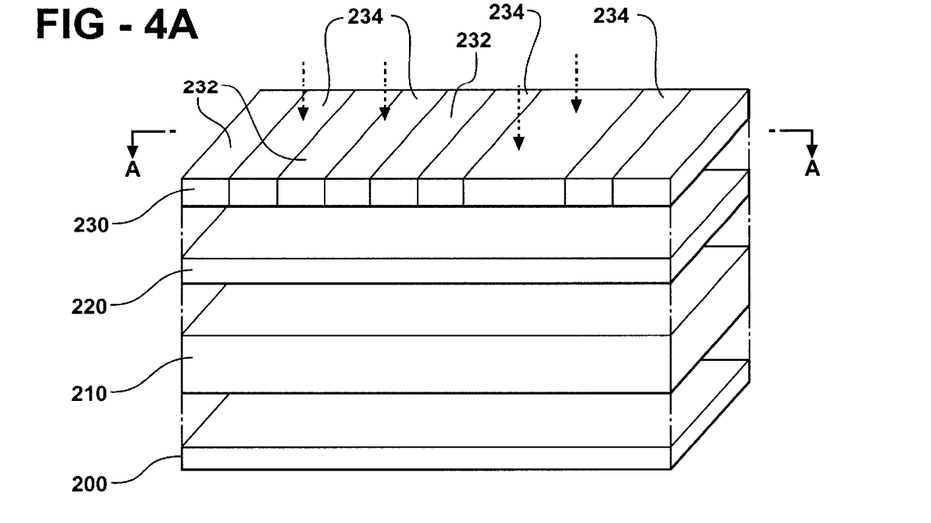
FIG. 4A is a view illustrating the pattern of conductive electrodes according to the present invention.
Figure 4B:
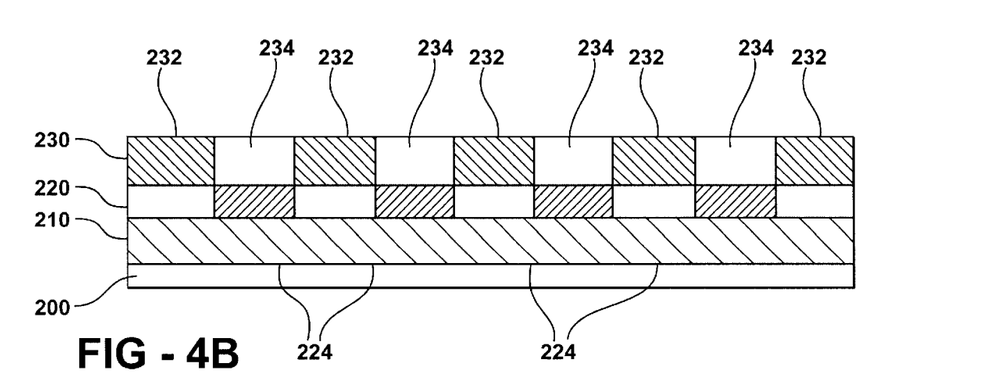
FIG. 4B is a partial sectional view of FIG. 4A.
Figure 4C:
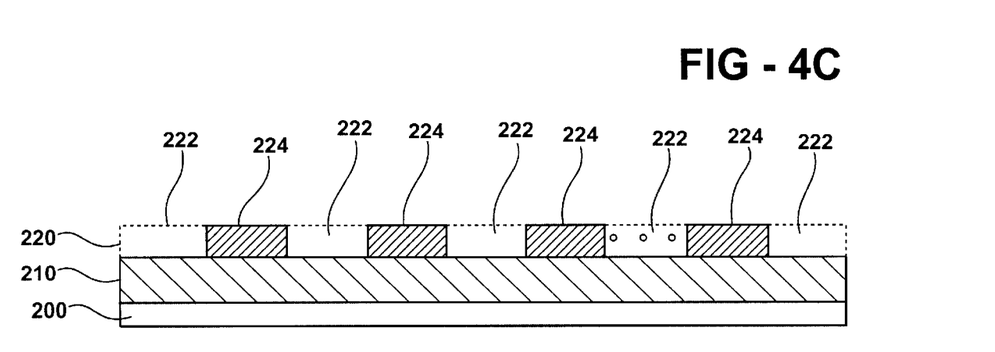
FIG. 4C is a view illustrating the electrode pattern of FIG. 4A wherein a film for exposure to light is removed and a photosensitive material is developed and hardened.
Figure 4D:
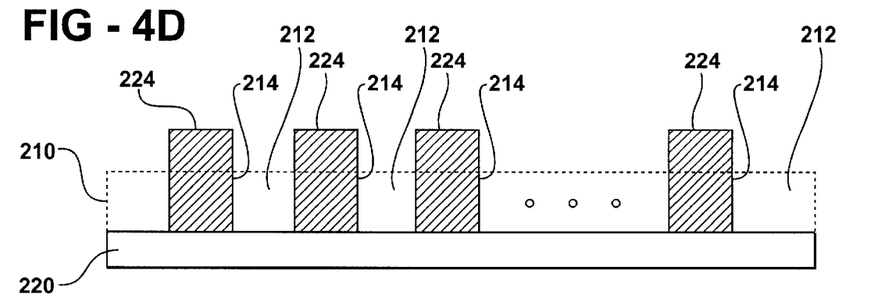
FIG. 4D is a view illustrating the electrode pattern of FIG. 4A wherein a metal plate on the substrate is etched.
Figure 4E:
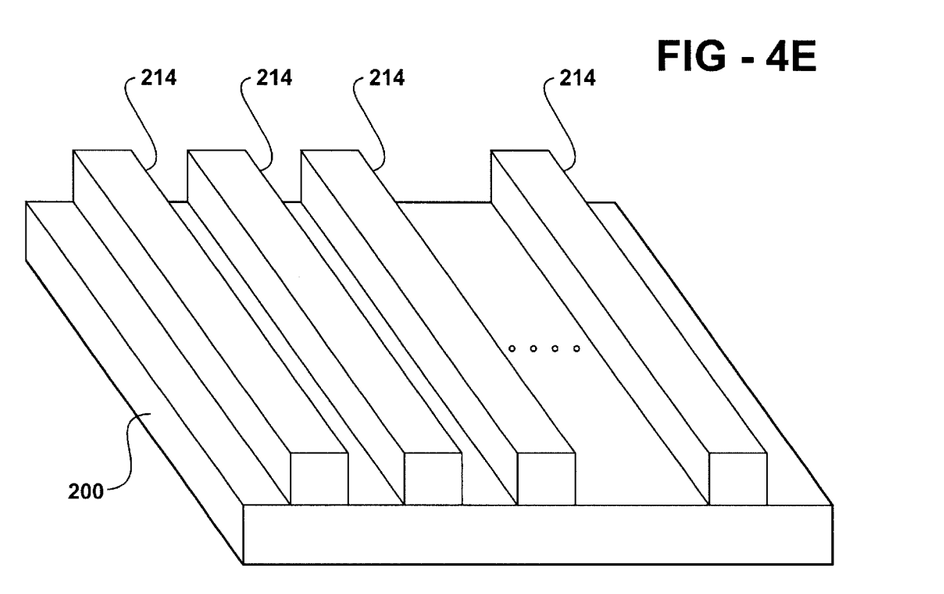
FIG. 4E is a view illustrating a plurality of line-shaped electrodes formed on the substrate by removing the hardened photosensitive material.

FIGS. 4A to 4E illustrate the manufacturing process of the conductive electrodes of the shape detection section according to an embodiment of the present invention. In detail, FIG. 4A is a view illustrating a film for exposure to light which has negative portions corresponding to the pattern of the conductive electrodes, a photosensitive material, a metal plate, and an insulating substrate, which are laminated according to the present invention. FIG. 4B is a partial sectional view of FIG. 4A. FIG. 4C is a view illustrating the pattern of the electrodes wherein the film for exposure to light is removed and the photosensitive material is developed and hardened. FIG. 4D is a view illustrating the electrode pattern wherein the metal plate on the substrate is etched. FIG. 4E is a view illustrating a plurality of line-shaped electrodes formed on the substrate by removing the hardened photosensitive material.

Figures 5A, 5B:
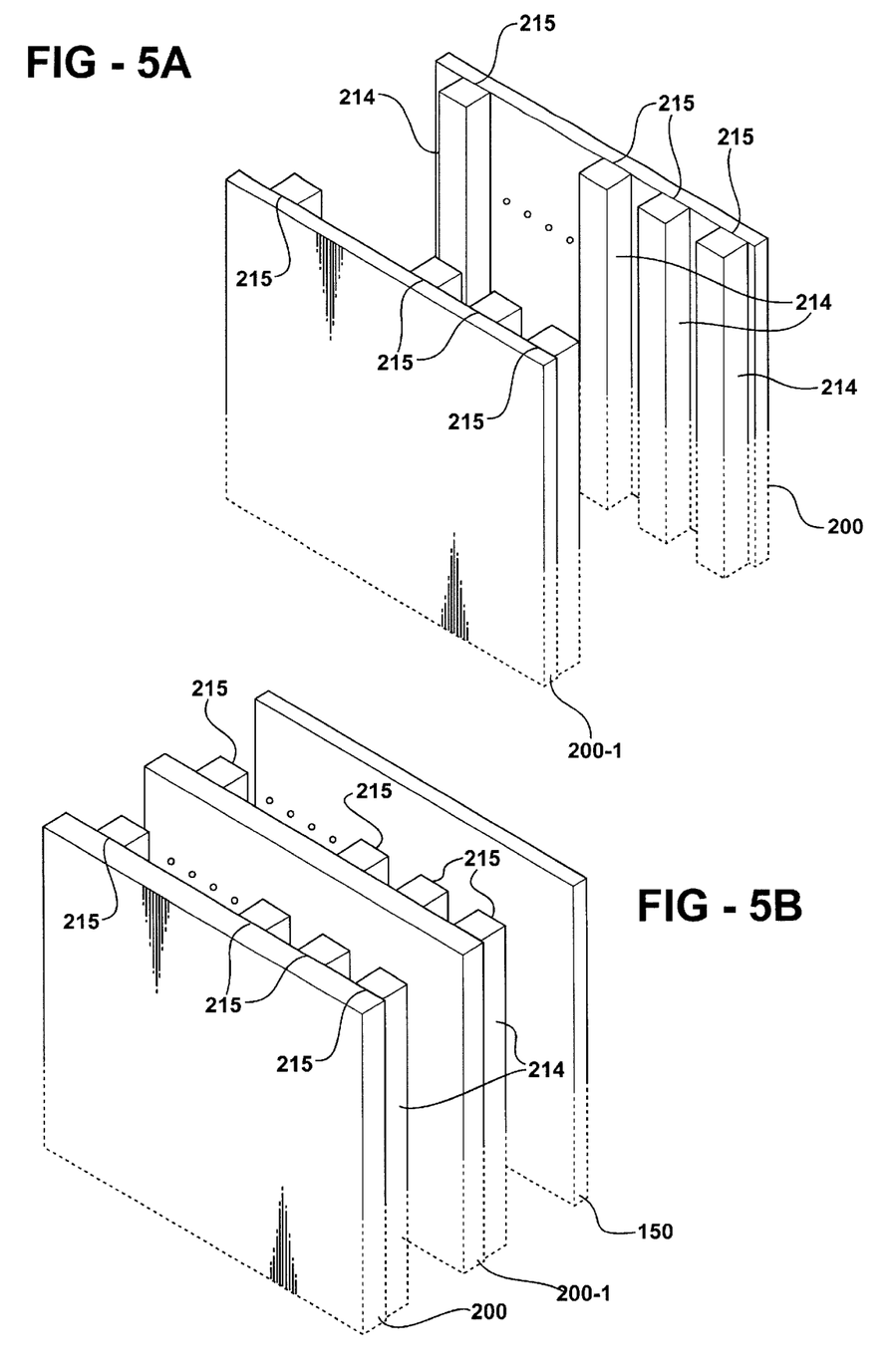
FIG. 5A is a view illustrating the substrates having line-shaped electrodes formed thereon and arranged to face each other according to the present invention.
FIG. 5B is a view illustrating the substrates having line-shaped electrodes formed thereon and arranged in the same direction according to the present invention.

FIG. 5A is a view illustrating the substrates having line-shaped electrodes formed thereon and arranged to face each other according to an embodiment of the present invention, and FIG. 5B is a view illustrating the substrates having line-shaped electrodes formed thereon and arranged in the same direction according to another embodiment of the present invention.

Figure 6A:
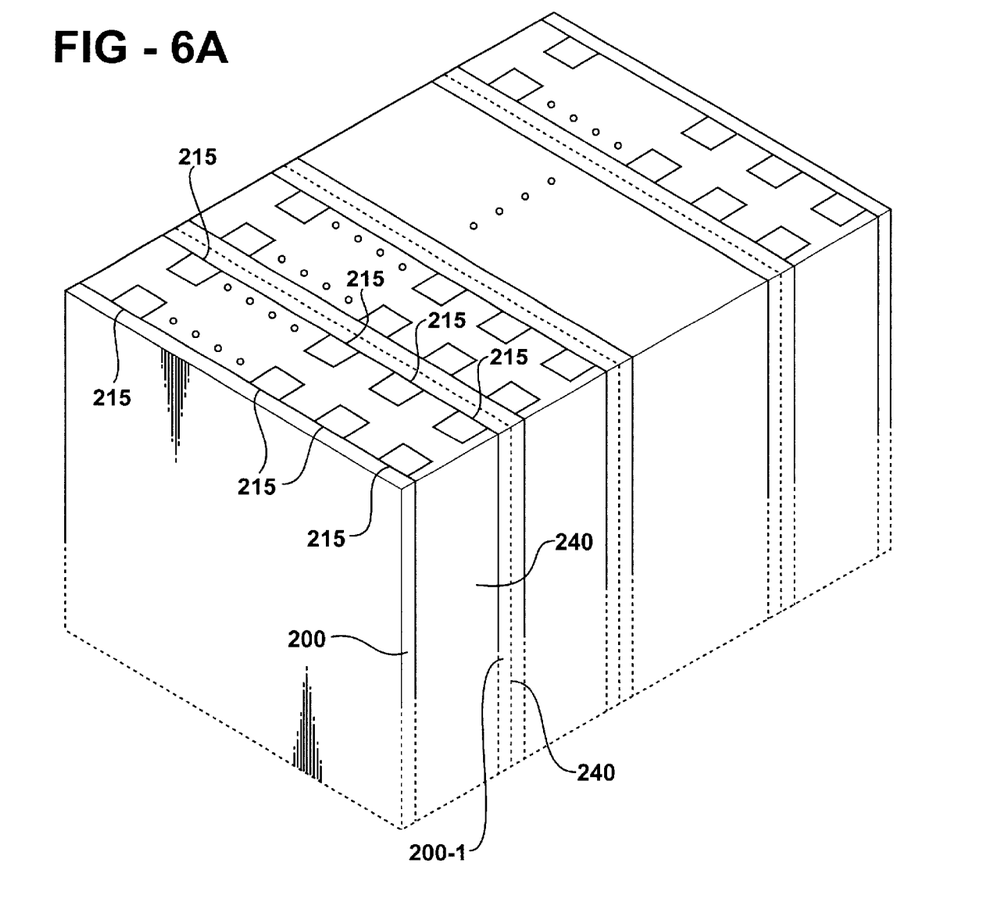
FIG. 6A is a view illustrating the shape detection section wherein a plurality of substrates arranged face to face are laminated according to the present invention.
Figure 6B:
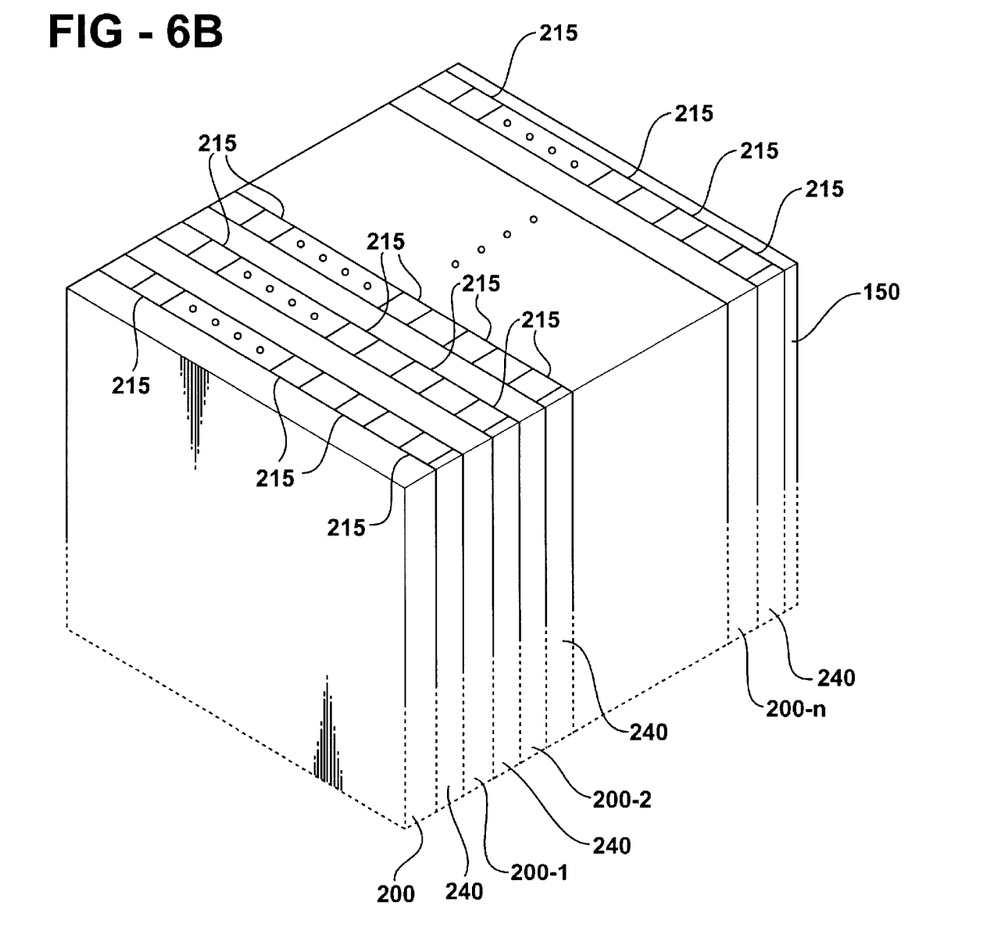
FIG. 6B is a view illustrating the shape detection section wherein a plurality of substrates arranged in the same direction are laminated according to the present invention.

FIG. 6A is a view illustrating the shape detection section wherein a plurality of substrates arranged face to face are laminated according to an embodiment of the present invention, and FIG. 6B is a view illustrating the shape detection section wherein a plurality of substrates arranged in the same direction are laminated according to another embodiment of the present invention.

Figure 7A:
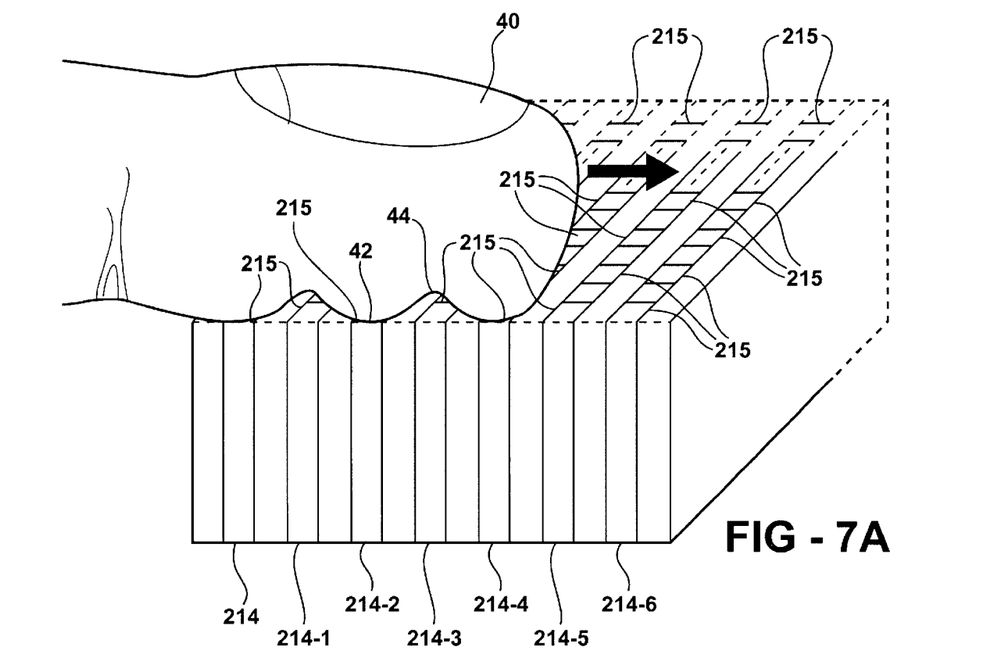
FIGS. 7A and 7B are views illustrating the direct contact type shape detecting device in use according to the present invention.
Figure 7B:
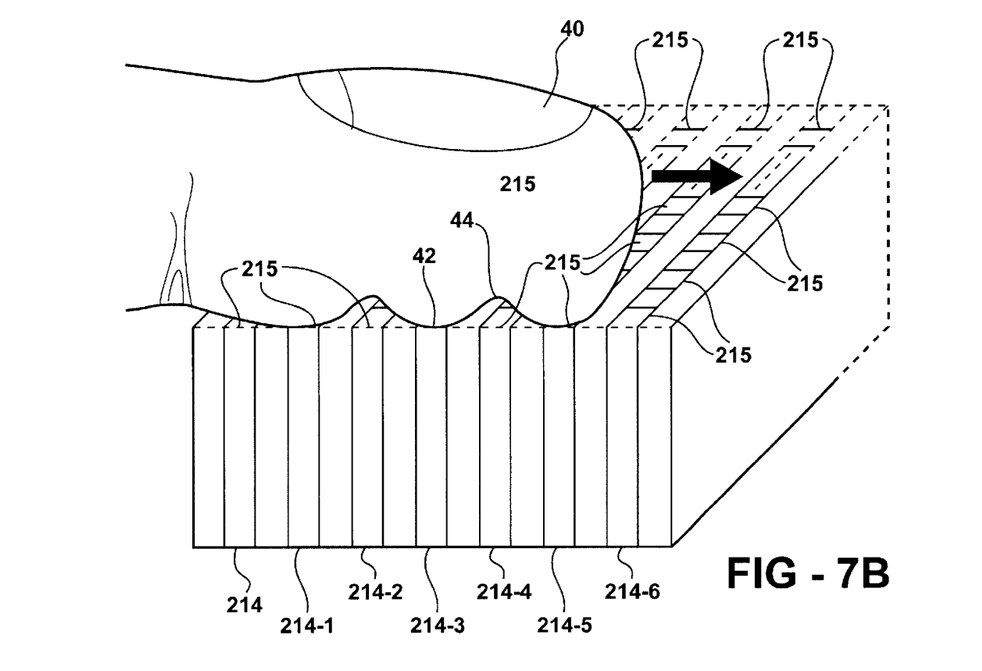

FIGS. 7A and 7B are views illustrating the direct contact type shape detecting device in use according to the present invention.

The shape detection section 10 according to the present invention includes two substrates 200 and 200-1 each of which has a plurality of electrodes 214 formed on one surface thereof and having a width and a thickness of about 0.1 mm at maximum, the substrates being arranged to face each other with a space of about 0.1 mm at maximum therebetween, and an insulating adhesive 240 filled in the space between the substrates 200 and 200-1 arranged to face each other to bond the substrates.

The method of manufacturing the shape detection section 10 according to the present invention comprises the steps of:

forming a plurality of line-shaped electrodes 214 on insulating substrates 200 and 200-1, the electrode forming step including a first substep of forming a conductive metal plate 210 on each of the insulating substrates, a second substep of coating as a thin film a photosensitive material 220 on the metal plate 210, a third substep of adhering on the photosensitive material 220 a film 230 for exposure to light which is composed of light-permeable negative portions 234 formed corresponding to the shape of the line-shaped electrodes 214 and non-light-permeable positive portions 232, a fourth substep of making a selective chemical change with respect to corresponding portions of the photosensitive material 220 to the negative portions 234 of the film 230 by irradiating light to the film 230, a fifth substep of removing the film 230 for causing the photosensitive material 220 to make the selective photosensitive chemical change, a sixth substep of forming chemically stable hardened portions on the metal plate 210 by a developing and hardening process of the chemically changed photosensitive material, a seventh substep of corroding and removing portions of the metal plate 210 on which the chemically stable hardened portions 224 are not formed by soaking the metal plate 210 in a metal-corrosive solution, and an eighth substep of excoriating and removing the chemically stable hardened portions 224;

arranging the substrates 200 and 200-1 having the line-shaped electrodes 214 formed thereon to face each other with a predetermined space therebetween;

bonding the substrates 200 and 200-1 together by filling an insulating adhesive 240 into the space between the substrates; and grinding edge portions 215 of the electrodes formed on the substrates 200 and 200-1 bonded together.

The construction and operation of the shape detection device according to the present invention will now be explained in detail with reference to the accompanying drawings.

Referring to FIG. 4A, a conductive metal plate 210 having a maximum uniform thickness of about 0.1 mm is bonded on the insulating substrate 200, and a photosensitive material 220 is coated on the metal plate 210 as a thin uniform film. Thereafter, a film 230 for exposure to light, which has light-permeable negative portions 234 formed corresponding to the pattern of a plurality of line-shaped electrodes 214, is adhered with the photosensitive material 220, and then the film 230 is exposed to light.

At this time, the widths of the negative portions 234 and the positive portions 232 of the film 230 are determined to be about 0.1 mm at maximum, respectively.

FIG. 4A shows the chemical reaction portions 224 of the photosensitive material 220 which react chemically to the light irradiated thereto through the negative portions 234 of the film 230.

FIG. 4C shows the chemically stable hardened portions 224 formed by removing the film 230 for exposure to light, developing and hardening the photosensitive material 220, and then removing the portions 222 of the photosensitive material 220 which are not exposed to light.

FIG. 4D shows the state when the portions 212 of the metal plate 210, on which the chemically stable hardened portions 224 are not formed, are corroded and removed by soaking the metal plate 210 and the insulating substrate 200 in a metal-corrosive solution.

FIG. 4E shows a plurality of line-shaped electrodes 214 having the width and thickness of about 0.1 mm and formed on the substrate 200 by removing the hardened portions 224 after the corroding process.

According to other embodiments of the present invention, which are similar to the embodiment as described above, the line-shaped electrodes 214 may be formed by printing a conductive material on the insulating substrate 200, or by bonding conductive wires having the maximum width and thickness of about 0.1 mm to the substrate 200 with a maximum space of about 0.1 mm therebetween.

The insulating substrate 200 may be made of any material having superior anti-wear and insulating characteristics such as epoxy resins, ceramics, glass, reinforced plastics, etc.

FIGS. 5A and 5B show a plurality of substrates 200 which have a plurality of conductive line-shaped electrodes 214 formed on one surface thereof and are arranged to face each other or in the same direction.

In case of arranging the substrates 200 and 200-1 to face each other as shown in FIG. 5A, the substrates are fixed in a manner that the plurality of the line-shaped electrodes 214 formed on the substrates are positioned with a maximum space of 0.1 mm using a mold or casting (not illustrated), and then the insulating adhesive 240 is inserted within the space.

In case of arranging the substrates 200 and 200-1 in the same direction as shown in FIG. 5B, a cover substrate 150 is provided to protect the line-shaped electrodes 214 of the substrate 200-1, and the insulating adhesive 240 is filled into each space among the respective substrates 200, 200-1, and 150.

The edge portions 215 of the electrodes 214 on the substrate 200 which are formed as described above are evenly ground to provide a good contact surface of the shape detection section 10 thus allowing the shape detection section 10 to easily detect the minute electric signals flowing through the object.

However, the shape detection section 10 produced through the above-described process only has the conductive end portions 215 of the row and column electrodes 214, and thus can detect only a portion of the object or the fingerprint 40. The whole shape of the object or the fingerprint can be detected by programs built in the shape discrimination section 20 by moving the object at a constant speed in row and column directions of the end portions 215 of the electrodes 214. The moving direction of the object can be more easily discriminated if the object moves in the row direction of the end portions 215 of the electrodes 214. In other words, the one-dimensional movement of the object can be more easily discriminated by processing the detected signals from the end portions 215 of the electrodes by programs built in the shape discrimination section 20.

The shape discrimination section 20 recognizes the change of the electric signals applied from the end portions 215 of the electrodes, discriminates whether the present mode is a shape detection mode of a standstill object or a moving object, or a moving direction detecting mode of a moving object by the built-in programs, and then supplies a control signal to the display/control section 30 as a result of the discrimination.

FIGS. 6A and 6B show the state when a plurality of the shape detection sections 10 formed by the above-described process are laminated according to the embodiment of the present invention. The laminated shape detection sections can detect the shape of a relatively large object or fingerprint all at once, and can detect any moving direction of the object on a two-dimensional plane at a high speed with its moving speed.

FIGS. 7A and 7B show the state of use of the direct contact type shape detection device 10 according to the present invention, wherein a plurality of end portions 215 of the electrodes having the maximum width, thickness, and space of about 0.1 mm are arranged.

In the embodiments of the present invention, as shown in FIG. 7A, the minute electric signals sensed by and transmitted from the end portions 215 of the electrodes 214, 214-2, and 214-4 which are directly in contact with the fingerprint 40 and the electric signals sensed by and transmitted from the end portions 215 of the electrodes 214-1, 214-3, and 214-5 which are not directly in contact with the fingerprint 40 are applied to the shape discrimination section 20 through transmission lines (not illustrated) connected to opposite portions of the end portions 215 of the electrodes. The shape discrimination section 20 recognizes and discriminates the shape of the fingerprint 40 by data-processing the received electric signals, and then provides the corresponding control signal to the display/control section 30, for instance, a supervisory monitor, to display the shape of the discriminated fingerprint 40.

In the event that the fingerprint 40 placed on the end portions 215 of the shape detection section 10 moves from the state of FIG. 7A to the state of FIG. 7B, the supply of the minute electric signals from the end portions 215 of the electrodes 214, 214-2, and 214-4 which were directly in contact with the fingerprint 40 to the shape discrimination section 20 is discontinued, but minute electric signals are now sensed by and transmitted from the end portions 215 of the electrodes 214-1, 214-3, and 214-5 which were not directly in contact with the fingerprint 40 to the shape discrimination section 20.

The shape discrimination section 20 receives and data-processes the changed minute electric signals being supplied thereto. Accordingly the shape discrimination section 20 discriminates that the fingerprint 40 has been moved from the position corresponding to the end portions 215 of the electrodes 214, 214-2, and 214-4 to the position corresponding to the end portions 215 of the electrodes 214-1, 214-3, and 214-5, and then outputs the corresponding control signal to the display/control section 30. Accordingly, it can perform the function of a mouse or a joystick used in a multimedia appliance.

The minute electric signals detected from the shape of the object by the end portions 215 of the electrodes 214 of the shape detection section 10 are transmitted to the shape discrimination section 20 through signal transmission lines the shape of which is similar to that of the signal transmission lines in FIG. 3A, and which are respectively connected to the lower portions of the electrodes 214.

The shape discrimination section 20 recognizes and discriminates the shape or the direction of movement of the finger print 40 or object by analyzing and data-processing the received signals, and providing the corresponding control signal to the display/control section 30.

The end portions 215 of the electrodes may be arranged in a row, or may be arranged in multiple rows as wide as the size of the fingerprint 40 or object. In case of detecting the direction of movement of the object, the end portions of the electrodes may be arranged differently in accordance with the size of the object.

As described above, according to the present invention, the conductive metal plate formed on the substrate can be used as the detection portions of the shape detection section for detecting the minute electric signals flowing through the fingerprint or object as well as the electric paths merely passing the sensed electric signals therethrough, and thus the present invention can provide a direct contact type shape detection device which can lengthen its life span and can be manufactured at a low cost with superior productivity.

Further, by applying thereto electronic circuits and software application techniques for detecting and data-processing the minute electric signals flowing through the object, the shape detection device according to the present invention can be widely applied to application fields having similar functions such as security devices.

While the present invention has been described and illustrated herein with reference to the preferred embodiments thereof, it will be understood by those skilled in the art that various changes in form and details may be made therein without departing from the spirit and scope of the invention.

What is claimed is:

1. A shape detection device comprising:
    a first substrate,
    a first plurality of electrodes disposed in parallel and spaced in relationship to one another on said first substrate,
    a second substrate
    a second plurality of electrodes disposed in parallel and spaced relationship to one another on said second substrate,
    an adhesive securing said substrates together in parallel relationship to one another with said first and second plurality of electrodes disposed in parallel relationship to one another,
    said first and second substrates having edges and first and second plurality of electrodes having ends finished to lie in the same plane as said edges to define a shape discrimination surface for detecting shape and direction of movement of an object across said ends of said first and second plurality of electrodes,
    said adhesive being disposed within each of or between said first and second pluralities of electrodes and said first and second plurality of electrodes are disposed on said first and second substrates to hold said electrodes rigid and isolated from one another and individually surrounded by said substrates and said adhesive to render said discrimination surface rigid for detecting an object on said discrimination surface.

2. A device as set forth in claim 1 including a display/control section for providing an output in response to the sensed signals outputted from said ends of said electrodes.

3. A device as set forth in claim 1 including a third substrate and a third plurality of electrodes and an adhesive securing said third substrate to said first and second substrates with said third plurality of electrodes parallel to said first and second plurality of electrodes and with the ends of said third plurality of electrodes finished to lie in said plane with said ends of said first and second plurality of electrodes.

4. A device as set forth in claim 1 wherein the width and thickness of said electrodes is approximately 0.1 mm and the space between parallel electrodes is not greater than 0.1 mm.

5. A device as set forth in claim 1 wherein said second substrate is disposed between said first and second pluralities of electrodes.

6. A device as set forth in claim 5 including a cover substrate disposed over said second plurality of electrodes.

* * * * *